Patented July 4, 1944

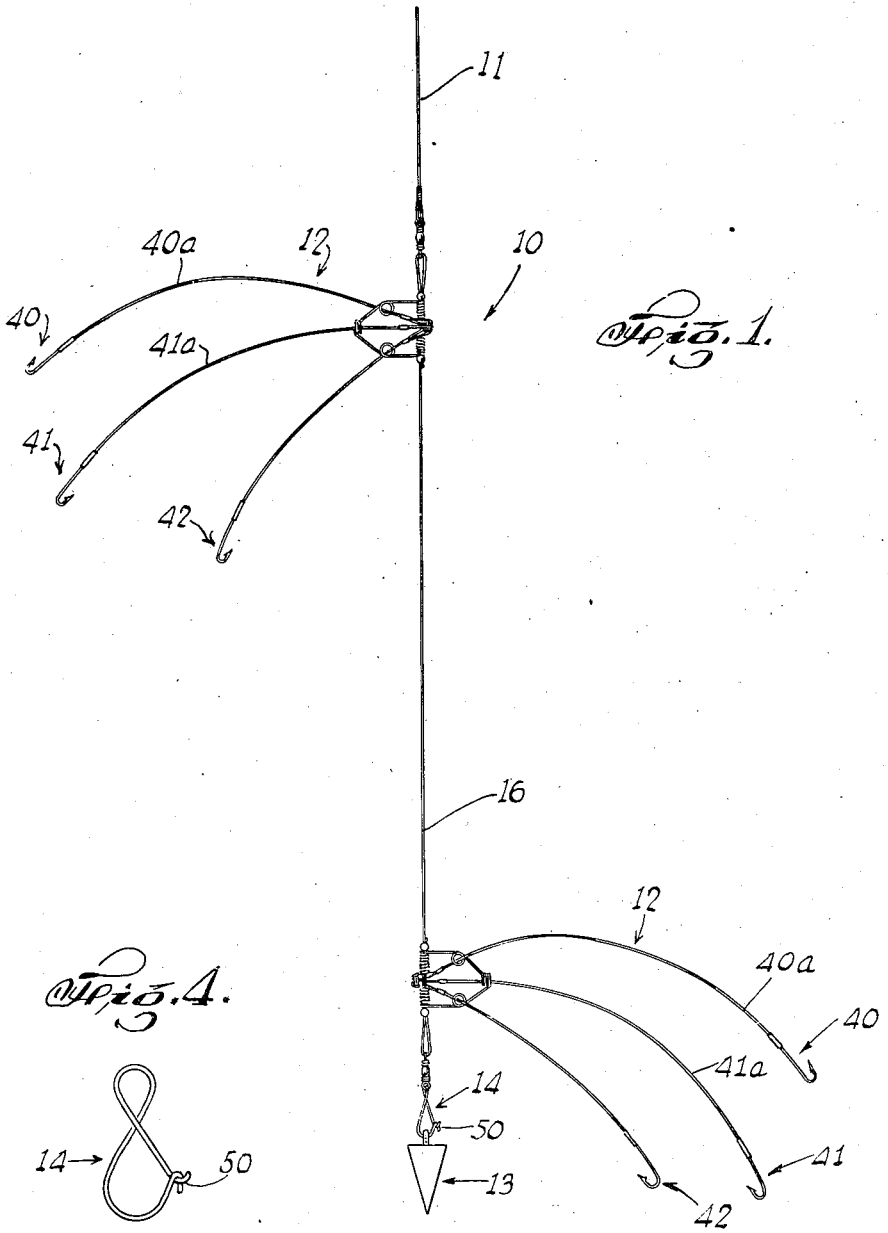

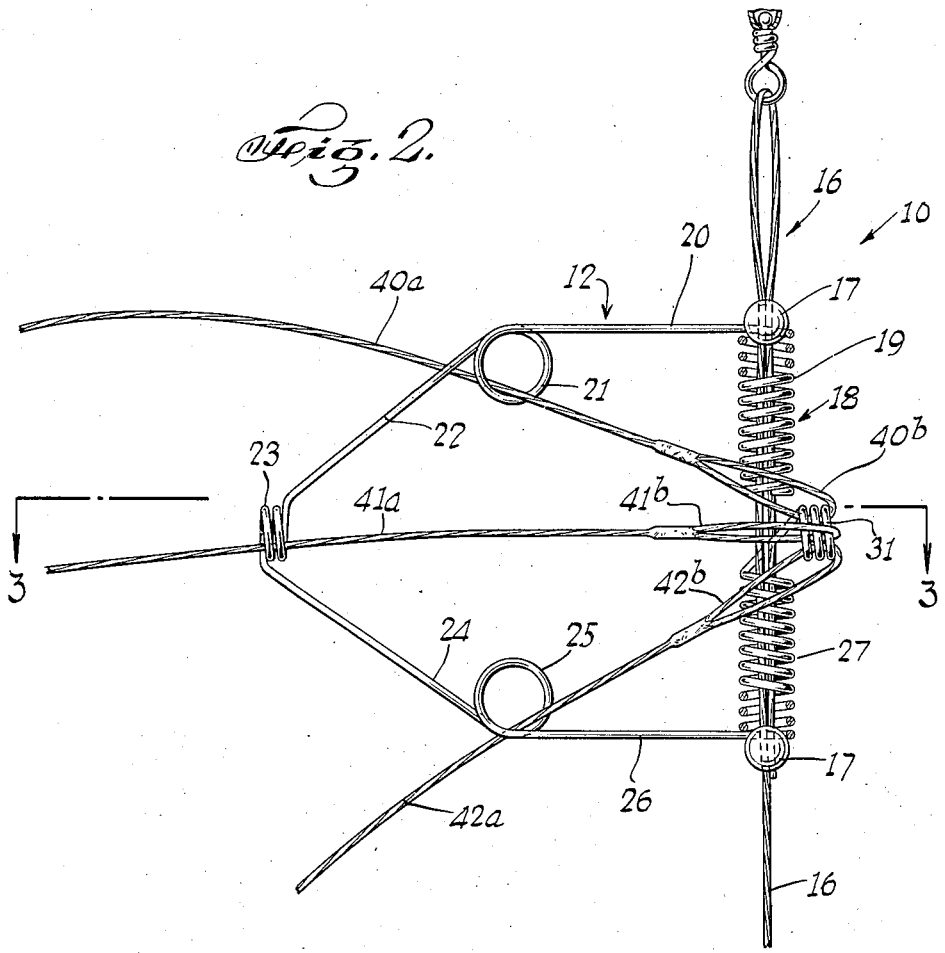
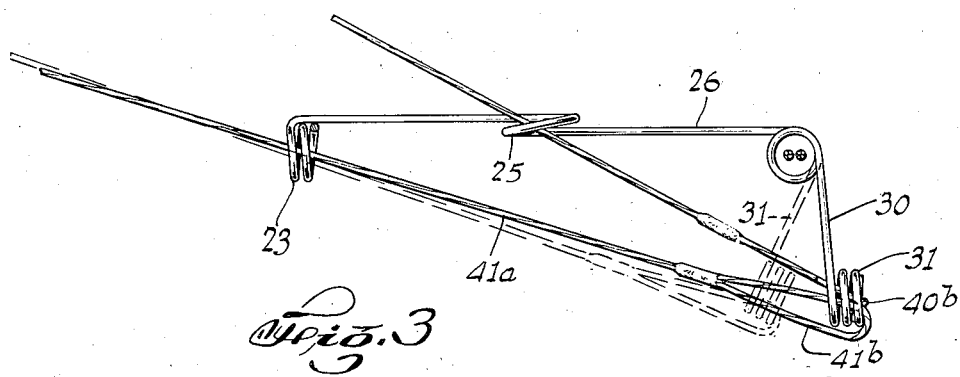

2,352,631

UNITED STATES PATENT OFFICE 2,352,631

KNEE ACTION FISHING TACKLE

Edward Guarnieri, Trenton, N. J.

Application April 1, 1942, Serial No. 437,182

8 Claims. (Cl. 43—27)

The invention relates to fishing tackle.

An object of this invention is to provide fishing tackle so constructed that as soon as the fish takes the bait, the knee action coil will pull on the hook so that the hook has a continuous strain, and the fish cannot spit the bait out, but instead gets hooked more securely preventing loss of the fish.

Another object of this invention is to provide a sturdy and compact fishing tackle of the character described, which shall be relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a front elevational view of fishing tackle embodying the invention, having a double unit;

Fig. 2 is an enlarged front elevational view of one of the units;

Fig. 3 is a cross-sectional view taken on line 3—3 of Fig. 2; and

Fig. 4 is a front elevational view of the sinker attachment.

Referring now in detail to the drawings, 10 designates fishing tackle embodying the invention, comprising a fishing line 11 provided with two knee action hook units 12, and provided with a sinker 13 at its lower end connected to the line 11 by a connector 14. The two units 12 are similar and symmetrically disposed, and one of said units only will be described.

The unit 12 comprises a piece of cord 16, to which there is fixed a pair of spaced balls 17 through which the line passes. Mounted on the line 16 between the balls 17, is a member 18 which may be made of resilient wire. Member 18 comprises a spring helical coil 19 disposed about the line 16 and between the balls 17, and contacting one of said balls. Extending from the coil 19 to one side, is an offset portion 20.

At the end of portion 20 is a loop or signal coil 21. Extending from loop 21 is an inclined arm 22 terminating in a double coil 23. Extending from the double coil 23, is an inclined arm 24, perpendicular with the arm 22, and having at its end, a signal loop or coil 25, similar, and symmetrically disposed with respect to loop 21. Extending from loop 25 is an arm 26, parallel to arm 20. At the end of arm 26 is a helical spring coil 27 likewise disposed about the portion of the cord 16 and contacting the other ball 17.

Extending from the inner end of loop 27 is an offset arm 30, disposed substantially at right angles to the plane of portions 20, 22, 24 and 26. At the end of arm 30 is a triple coil 31, the axis of which is disposed at right angles to the axis of coils 19, 27.

It will be noted that member 18 is made of a single piece of wire. The axis of coil 23 is parallel to the axis of coil 31. Coils 19 and 27 are in alignement and co-axial. Members 20, 22, 24 and 26 are substantially in a single plane. Each unit is adapted to support three hooks 40, 41 and 42. The hook 40 is connected to a cord 40a passing through loop 21. At the end of cord 40a is a loop 40b receiving a portion of the coil 31.

Hook 41 is connected to a cord 41a passing through the loop 23. At the end of cord 41a is a loop 41b, likewise receiving a portion of the loop 31. Hook 42 is connected to a cord 42a passing through a loop 45. At the end of cord 42a is a loop 42b receiving a portion of loop 31.

When any of the hooks are engaged by a fish, a pull on the hook will cause arm 30 to be pulled. Spring 27, however, acts like a torsion spring, causing a resilient knee action which puts a strain or pull on the fish, preventing the bait from being spitted out and more securely hooking the fish.

The connector 14 may be made of wire in the form of the numeral 8. It is connected at its upper end to line 16, and has interengaging, releasable hook portions 50. The hook portions 50 may be disengaged to remove the sinker 13.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In fishing tackle, a line, a pair of spaced abutments fixed to said line, a member mounted on the line and fixed to said abutments, said member being made of a single piece of resilient wire, and having coil portions receiving said line, and contacting said abutments, one of said coil portions having an offset arm provided with a loop at its end, the outer ends of said coil portions being interconnected by a portion having a plurality of loops, and hooks on cords passing through said plurality of loops, said cords being formed with loops receiving the loop of said offset arm.

2. In fishing tackle comprising a line, a pair of spaced abutments on said line fixed thereto, a member on said line and between said abutments having a pair of coil portions, the outer ends of said coil portions engaging said abutments, means to interconnect the outer ends of said coil portions, and an offset arm on the inner end of one of said coil portions.

3. In fishing tackle comprising a line, a pair of spaced abutments on said line fixed thereto, a member on said line and between said abutments having a pair of coil portions, the outer ends of said coil portions engaging said abutments, means to interconnect the outer ends of said coil portions, an offset arm on the inner end of one of said coil portions, and a loop at the outer end of said offset arm.

4. In fishing tackle, a member made of a single piece of resilient wire, and comprising a pair of co-axial coil portions, and a portion interconnecting the outer ends of said coil portions, said interconnecting portion comprising a plurality of spaced coils and an offset arm at the inner end of one of said pair of coil portions and formed with a coil at its outer end.

5. In fishing tackle, a member made of a single piece of resilient wire, and comprising a pair of co-axial spaced coils, and an offset arm at the inner end of one of said coils formed with a loop at its outer end, the outer ends of said coils being interconnected by a portion disposed substantially in a plane at right angles to said arm.

6. In fishing tackle, a member made of a single piece of resilient wire, and comprising a pair of co-axial spaced coils, and an offset arm at the inner end of one of said coils formed with a loop at its outer end, the outer ends of said coils being interconnected by a portion disposed substantially in a plane at right angles to said arm, said interconnecting portion including a pair of loops having axes perpendicular to the axes of said pair of coils and also perpendicular to the axis of the coil of said offset arm.

7. In fishing tackle, a member made of a single piece of resilient wire, and comprising a pair of co-axial spaced coils, and an offset arm at the inner end of one of said coils formed with a loop at its outer end, the outer ends of said coils being interconnected by a portion disposed substantially in a plane at right angles to said arm, said interconnecting portion including a pair of loops having axes perpendicular to the axes of said pair of coils and also perpendicular to the axis of the coil of said offset arm, said interconnecting portion including a coil having an axis perpendicular to the axes of said pair of coils, and parallel to the axis of the coil at the outer end of said arm.

8. In fishing tackle, a member made of a single piece of resilient wire, and comprising a pair of co-axial spaced coils, an offset arm at the inner end of one of said coils formed with a loop at its outer end, the outer ends of said coils being interconnected by a portion disposed substantially in a plane at right angles to said arm, said interconnecting portion including a pair of loops having axes perpendicular to the axes of said pair of coils and also perpendicular to the axis of the coil of said offset arm, said interconnecting portion including a coil having an axis perpendicular to the axes of said pair of coils, and parallel to the axis of the coil at the outer end of said arm, and a line passing through said pair of co-axial coils, and abutments on said line contacting the outer ends of said coils.

EDWARD GUARNIERI.